United States Patent [19]

Bevan et al.

[11] 4,133,623

[45] Jan. 9, 1979

[54] PRODUCTION OF RUBBER TUBING FROM LATEX

[75] Inventors: Alfred R. Bevan, Welwyn Garden City; Ian Stephens, St. Albans, both of England

[73] Assignee: Malaysian Rubber Producers' Research Association, London, England

[21] Appl. No.: 802,192

[22] Filed: May 31, 1977

[30] Foreign Application Priority Data

Jun. 1, 1976 [GB] United Kingdom ............... 22688/76

[51] Int. Cl.² ............................................. B29D 23/04
[52] U.S. Cl. ................................ 425/133.1; 264/209; 425/200; 425/379 R; 425/380; 425/467; 425/812
[58] Field of Search .................... 425/190, 192 R, 380, 425/467, 203, 812, 113, 114, 378 R, 200, 379 R, 133.1, 468, 131.1; 264/209

[56] References Cited

U.S. PATENT DOCUMENTS

| | | | |
|---|---|---|---|
| 2,317,331 | 4/1943 | Mearig | 425/379 X |
| 2,977,632 | 4/1961 | Bunch | 425/380 X |
| 3,158,901 | 12/1964 | Westover | 425/379 |
| 3,169,272 | 2/1965 | Maxson | 425/380 X |
| 3,365,750 | 1/1968 | Donald | 425/133.1 |
| 3,447,204 | 6/1969 | Lainson | 425/133.1 |
| 3,558,758 | 1/1971 | Wenot et al. | 425/200 X |
| 3,780,154 | 12/1973 | Muller et al. | 425/467 X |
| 4,021,174 | 5/1977 | Breitzman | 425/200 X |

Primary Examiner—Richard B. Lazarus
Assistant Examiner—Mark Rosenbaum
Attorney, Agent, or Firm—Wenderoth, Lind & Ponack

[57] ABSTRACT

An apparatus for extruding latex in tubular form comprises a head block carrying two plugs which respectively have secured in them the upper ends of two tubes disposed coaxially one within the other. The inner surface of the outer tube and the outer surface of the inner tube are accurately formed with respect to the common axis, and an annular chamber opens to an annular space formed between the tubes in the head block. An inlet passage for latex opens to the chamber and is inclined to the radial direction so as to induce a circumferential flow of the latex into the chamber. A valve device may be provided to enable different latices to be fed selectively into the inlet passage, and a stirrer is disposed in the inlet passage where the latices enter for blending the latices on changeover from one to another during uninterrupted extrusion. A hot water jacket encircles the tubes below the head block and a cold water jacket between the hot water jacket and the chamber prevents heat from the hot water jacket from causing premature gelling of the latex.

9 Claims, 6 Drawing Figures

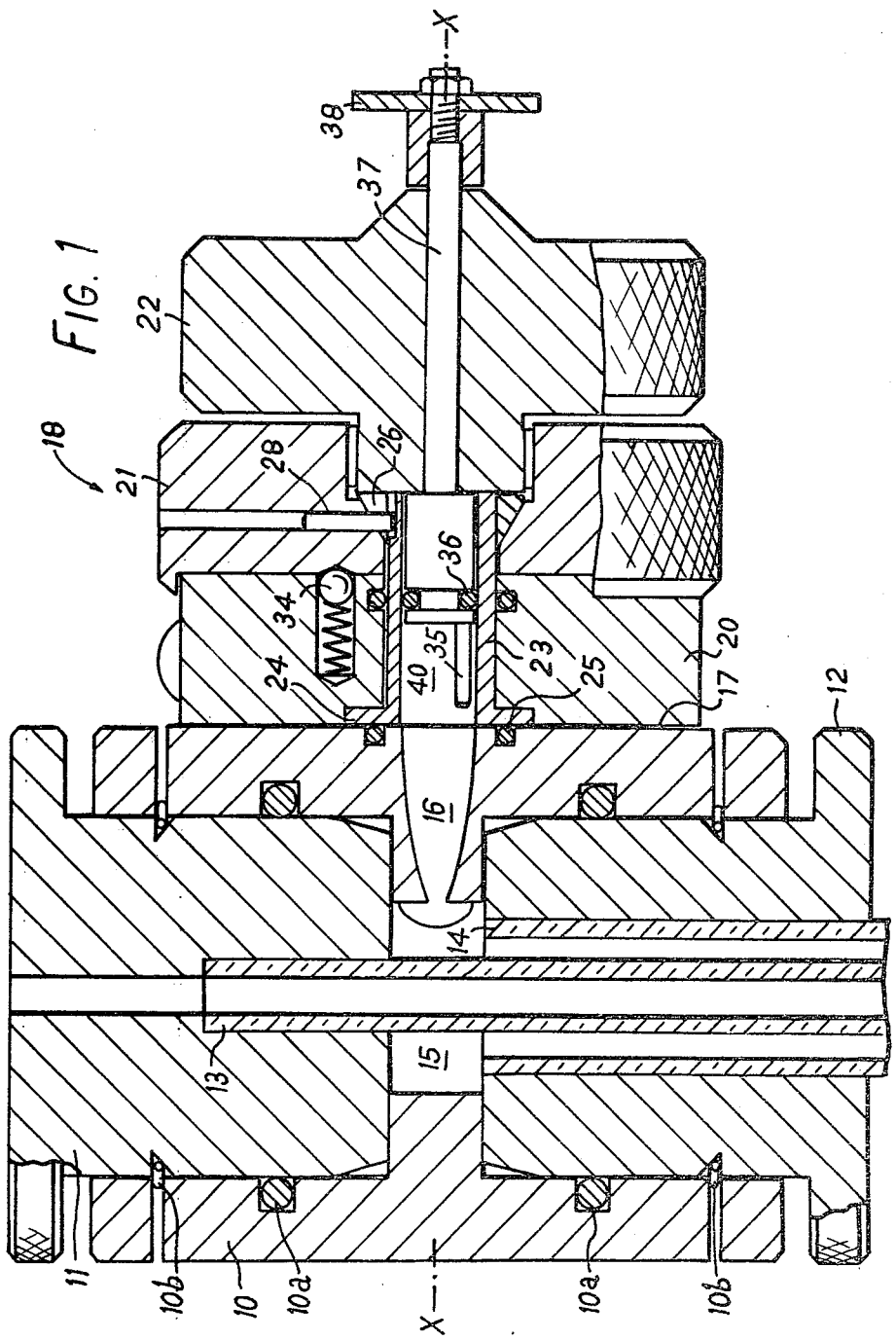

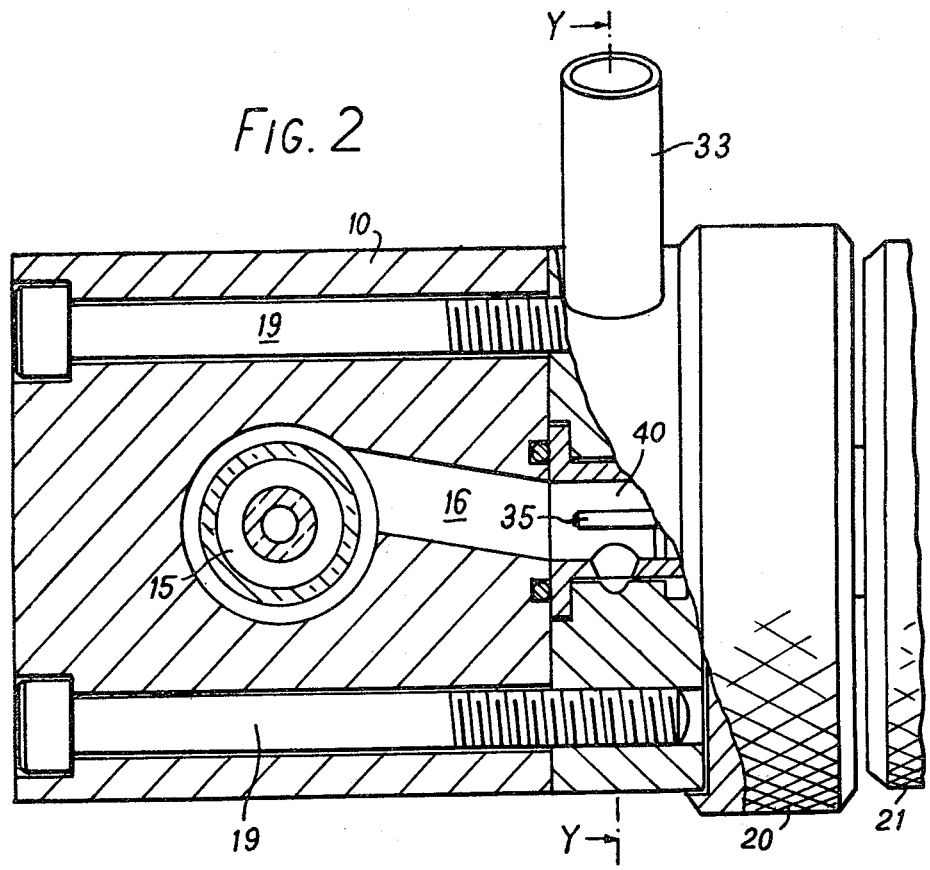
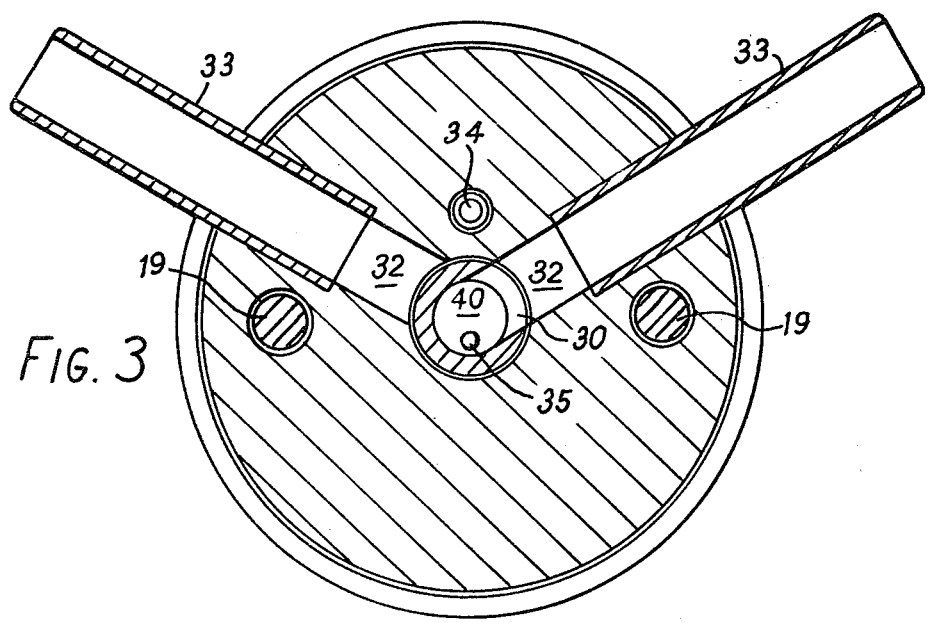

PRODUCTION OF RUBBER TUBING FROM LATEX

BACKGROUND OF THE INVENTION

This invention is concerned with the production of rubber tubing from latex using an improved extrusion apparatus. Tubing made in such apparatus has a variety of applications, for example in the production of catheters and other tubing for medical use. Different forms of apparatus can be used to produce large diameter tubing which can be formed into elastic bands or rubber thread, to produce single or multiple bore tubing having a wide range of diameters including capillary tubing, and to produce tubing having complex profile from solid or foamed rubber.

The production of rubber tubing from latex by extrusion under gravity is well known. Usually a prevulcanized or post vulcanizable heat sensitive latex compound is used and is delivered under gravity from a constant head storage tank device through a glass head to the annular space between two concentric glass tubes where it comes into contact with a heated zone and forms a solid wet gel which is extruded from the lower extremities of the tubes. The wet gelled tubing is passed into a leaching tank and thence through the usual drying and, if necessary, vulcanization stages. Care must be taken in handling such tubing to prevent self-adhesion. The prevention of self-adhesion is assisted by halogenation of both the outer surface and bore of the tubing or by the application of a suitable lubricant.

It is found to be essential to have the tubes of the extrusion apparatus concentric, otherwise the wet gel is prevented from flowing through the lower portion of the tubes under gravitational pressure.

A disadvantage of the type of glass apparatus currently used is that the glass tubes are attached by fusion to a standard cone and socket ground glass joint. This almost invariably leads to distortion. It is consequently very difficult to obtain concentricity of the two tubes, the achievement of an acceptable result being usually dependent upon success in matching a pair of tubes, which is tedious. Furthermore, the tubes themselves are of standard borosilicate glass with variable bore size and wall thickness; thus it is very difficult to maintain concentricity along the length of the tube.

SUMMARY OF THE INVENTION

According to this invention there is provided a latex extruding apparatus which has a head block with two tubes each secured therein at one end in a sealing manner. One of the tubes is arranged coaxially within the other so as to form an annular passage therebetween and the block provides a chamber about the tube. This chamber opens into the annular passage, and an inlet passage for latex leads to the chamber. Finally means for venting the interior of the tube to atmosphere at the block end are provided.

Preferably, each of the tubes has the block end thereof bonded in a sealing manner in the central aperture of an annular plug which is screwed into or otherwise removably secured in the head block.

Rubber catheters are currently manufactured by one of three methods, namely: by compression moulding of solid rubber compounds, by extrusion of solid rubber compounds followed by manual assembly and finishing, or by a dipping process using polymer latices, with manual assembly and manual finishing.

Many catheters require a harder section at the tip to facilitate easy insertion without buckling while the softer tail section follows the usually irregular contours of the passage into which the catheter is being inserted with a minimum of displacement pressure being applied to the walls of the passage. This type of structure is sometimes achieved by physically bonding together two lengths of tubing of high and low modulus respectively and if necessary overlaying the bond with a strip of thin rubber to improve the bond strength and thus minimize the possibilities of bond failure, especially during insertion and removal of the catheter. The overlaid strip of rubber is a potential source of difficulty and discomfort during insertion and removal since it forms a projection around of the circumference of the tubing.

A further need in many catheters is for a multiplicity of longitudinal tubular passages to facilitate the injection and drainage of fluids and in some instances, the inflation of a 'retention cuff'. This has hitherto usually been achieved by hand assembly of rubber tubing of various sizes, bonding the tubing together by over-dipping or by repeated latex dipping interspersed with various fabrication stages. This type of manufacture is both labour-intensive and time-consuming.

Elastic bands are currently made by cutting lay-flat rubber tubing which has been prepared and extruded by conventional dry rubber processes. An advantage of the production of such bands by a latex process would be the higher modulus and elasticity usually associated with latex products, arising from the higher molecular weight of the rubber molecules which have not undergone the breakdown process (mestication) used to facilitate the mixing of dry rubber.

Rubber thread and tape is currently produced by extrusion from latex or by spirally cutting rubber tubing produced by conventional extrusion of dry rubber. The tubing produced by the latex extrusion process could be processed in the same way as the dry rubber tubing, but could be produced without the need for heavy and costly mixing and extrusion machinery.

The invention also provides a technique for the production of complex profiles by a latex extrusion method; again advantageous over the present dry rubber processes because of the very simple and inexpensive apparatus required in comparison with dry rubber mixers and extruders. There is a further advantage in that foam may be extruded to give profiles suitable for window seals, etc.

The apparatus according to the invention may conveniently utilize short lengths of precision-bore and precision-outside-diameter tubes which are permanently mounted in respective annular metal plugs of standard size which fit into respective sockets in a precision made metal head block. The tubes are cold bonded in the plugs and a range of sizes can be made available to fit in a common single metal head. Thus, changes in glass tube sizes and hence extruded latex tubing sizes can be made rapidly by temporarily interrupting the flow of latex to the head block whilst the plugs are removed and replaced by another set of plugs carrying glass tubes of the required size.

In one embodiment of the present invention the appratus is provided with a valve device which permits different compositions of latex compound to be introduced into the chamber and thence into the annular extrusion passage without interruption of the extrusion process, the different compositions merging smoothly with each other over a short transition length, thus enabling tubing with clearly defined lengths of different hardness to be made. The change from low to high module compound takes place in the liquid phase thus the transition is accomplished without need of bonding or overlaid reinforcement, there being no area of weakness between the two sections of different modulus. Further, the circumference of the tube is uniform along its entire length regardless of the modulus and a catheter made from this tubing is as a consequence capable of insertion and withdrawal with a minimum of discomfort.

In an embodiment capable of continuously extruding tubing having clearly defined longitudinal sections of high and low modulus with a facility to automatically control the relative length of each section, the rapid, smooth change from one compound supply to another is conveniently achieved by the provision of two (or more) gravity feed supply tanks containing latex compounds yielding rubbers having different modulii. These tanks are alternately connected to a small mixing chamber via a rotating gate valve which may be actuated to place one or the other of the latex supply tubes in communication with the inlet passage to the chamber. The valve also provides a 'closed' portion to enable the latex supply to be interrupted while one or both of the tubes are changed. The operations of the valve may be controlled by a timing mechanism capable of automatic programming. The valve incorporates a mixing space into which is fed the compound being supplied to the chamber in the head block. The volume of the mixing space is kept to a minimum, and the mixing space is placed adjacent to the chamber. Moreover it is necessary to avoid any dead spots which would result in 'streaking' or non-uniform transition from one compound to another.

In the first embodiment of the apparatus, the inlet passage to the chamber in the head block is inclined at an angle of 10° to the radial dimensions of the tubes to provide a circular motion in the chamber. The mixing space contains a stirrer so that rapid mixing of the different compositions is achieved on changeover.

Forms of apparatus are described below which enable multiple bore tubing to be obtained and which enable circular or non-circular sections to be extruded with either a solid or foam core.

BRIEF DESCRIPTION OF THE DRAWINGS

Some embodiments of the invention will now be described by way of example with reference to the accompanying drawings in which:

FIG. 1 shows a first embodiment of the invention in axial section;

FIG. 2 is a fragmentary sectional view on the axis X—X of FIG. 1, showing the attachment of the block containing the stirrer to the head;

FIG. 3 is a sectional view on the plane Y—Y of FIG. 2;

DETAILED DESCRIPTION OF THE INVENTION

Figure 4:
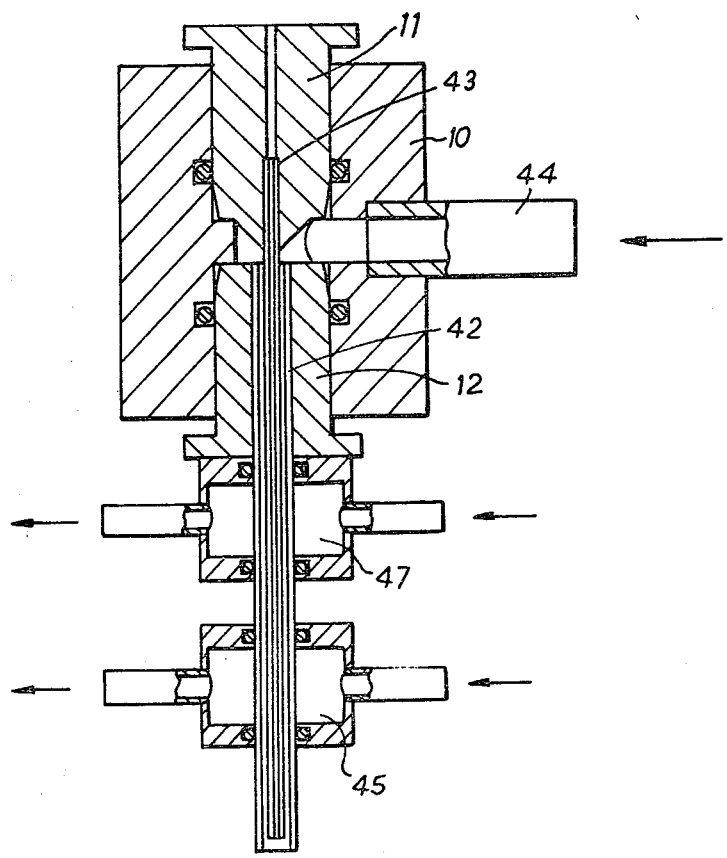
FIG. 4 shows another embodiment of the invention adapted for the production of capillary tubing.

The apparatus shown in FIGS. 1 to 3 comprises a metal body 10, preferably of stainless steel or Dural, and two coaxial annular plugs 11, 12 preferably of stainless steel which are located accurately in respective bores in the body, each plug being sealed by an 'O'-ring 10a and retained by a wire clip 10b. Plug 11 carries a tube 13 having a precision ground outer diameter, and plug 12 carries a precision bore tube 14, the tubes being accurately coaxially disposed to define between them a precisely annular space along their length. These tubes are preferably made of glass. Passage of the latex down this space enables the tubing to be formed by gelation of the latex. The two plugs are axially spaced apart to form with the inner tube 13 a chamber 15 in the body and the chamber has an inlet passage 16 extending from one face 17 of the block at an angle of 10° to a radial dimension of the chamber. This ensures that the latex entering the chamber moves in a rotational path in the chamber, resulting in a more even flow between the tubes 13, 14.

Mounted on face 17 of the body is a valve/stirrer unit 18, held is position by two screws 19. The unit 18 comprises a body 20 made from Tufnol, into which the screws 19 extend, a knurled valve operating knob 21, and a knurled fastening member 22. The body 20 has a central bore in which is rotatably disposed a valve sleeve 23 having an end flange 24 pressed against a sealing ring 25 accommodated in a groove in the face 17 of block 10. The central passage of the sleeve registers with the inlet passage 16. The other end of the sleeve 23 is clamped in a central bore of the operating knob 21 by a collet 26 which has a gap in its periphery, the collet being wedged in a rebate in the knob about the sleeve by the forward end face of the fastening member 22. Member 22 is screwed into a threaded recess in the rear face of knob 21 to tighten the collet on the sleeve. A pin 28 held in a radial bore in knob 21 extends through the gap in the collet 26 into an axial slot on the outer surface of the sleeve, so that rotation of knob 21 rotates the sleeve. The sleeve has an aperture 30 (see FIG. 3) which by such rotation can be brought into register with either of two radial passages 32 in the body 20. Pipes 33 engaged in these passages are connected to respective tanks (not shown) containing different compositions of latex compound each at a constant head. A spring-loaded ball 34 in the body 20 is engageable in any one of three depressions in the adjacent axial face of knob 21, corresponding respectively to the positions of the sleeve placing the two passages 32 in communication with the interior of the sleeve and a third position in which the sleeve blanks off both of the passages 32. A stirrer is mounted in the sleeve and comprises an axial pin 35 mounted eccentrically on a cylindrical boss rotatably mounted in the rearward end portion of the sleeve and sealed with respect to the sleeve by an 0-ring 36. The stirrer can be rotated by means of a spindle 37 which is secured to the boss and extends through the fastening member 22 and which has a coupling 38 on its rearward end connected to a variable speed motor (not shown) for operating the stirrer.

In use, the valve sleeve is turned by means of knob 21 to permit the flow of the desired latex compound from its constant head tank (which is necessary to enable the rate of extrusion to be maintained at a constant value) into the mixing space 40 within the sleeve and thence through the inlet passage 16 to the annular chamber form at the top end of the larger diameter tube 14, whence it flows down the annular space between the tubes and is gelled to form the latex tubing. When it is desired to change the modulus of the tubing, the valve sleeve is operated to cut off the latex supply from the first tank and to start the supply from the other tank. The stirrer is actuated so that the mixing of the two latex compounds is accomplished rapidly, giving rapid transition from one hardness to another in the finished rubber tubing. The process may be repeated so that rubber tubing of alternating modulus is obtained.

Although the operation has been described for only two different latex compounds, three or even more may be employed simply by providing the appropriate header tanks and modifying the sleeve valve to provide the requisite number of inlets. To increase the number of stations while still maintaining the sizes of the inlet ports of the valve and the lands between them the same, it may be necessary to increase the size of the sleeve of the valve and the diameter of the mixing space 40. Where this increases the dead space of the apparatus to an unacceptable extent, increasing the mixing time and the amount of streaking of the compounds on changeover, the diameter of the eccentric stirrer pin 35 can be increased to compensate for the increased size of the mixing space and maintain the dead space at a practical value.

It will also be seen that the diameters of the tubing made from the apparatus may simply be varied by changing plugs 11, 12 and the glass tubes which they carry.

The valve and the stirrer can both be operated automatically if desired.

Other modifications of the apparatus can be obtained by altering the arrangement of the glass tubes and plugs. For example the provision of another tube of small external diameter in the plug 11 radially outward of tube 13 enables a small bore passage to be produced in the wall of the tubing. Similarly, the substitution of a plug 11 carrying two glass tubes within the outer glass tube 14 enables dual bore tubing to be produced, and the substitution of glass or metal tubes of non-circular cross-section will enable extrusions of corresponding section, such as might be required as weather sealing strip or door seals, to be produced.

For the production of capillary tubing, the apparatus shown in FIG. 4 may be employed. In this apparatus, the plugs 12 and 11 carry respectively an outer precision bore glass tube 42 and an inner precision metal tube 43 preferably made from stainless steel, and the latex compound is introduced into the space between them through an inlet tube 44 by way of the space between the top of plug 12 and the bottom of plug 11.

Gelation of the latex compound during its passage through the extrusion section of the apparatus is achieved by the use of hot water jackets. These are however shown only in FIGS. 4, 5 and 6. In the arrangement shown in FIG. 4, a hot water jacket 45 is disposed about and sealed with respect to the outer tube 42, and a continuous flow of hot water is passed through the jacket. To prevent the heat from being conducted along the tubes to plug 12 where it would tend to initiate gelling prematurely, a cold water jacket 47 is similarly disposed about tube 42 between chamber 45 and plug 12 and a continuous flow of cold water is passed through jacket 47.

Figure 5:
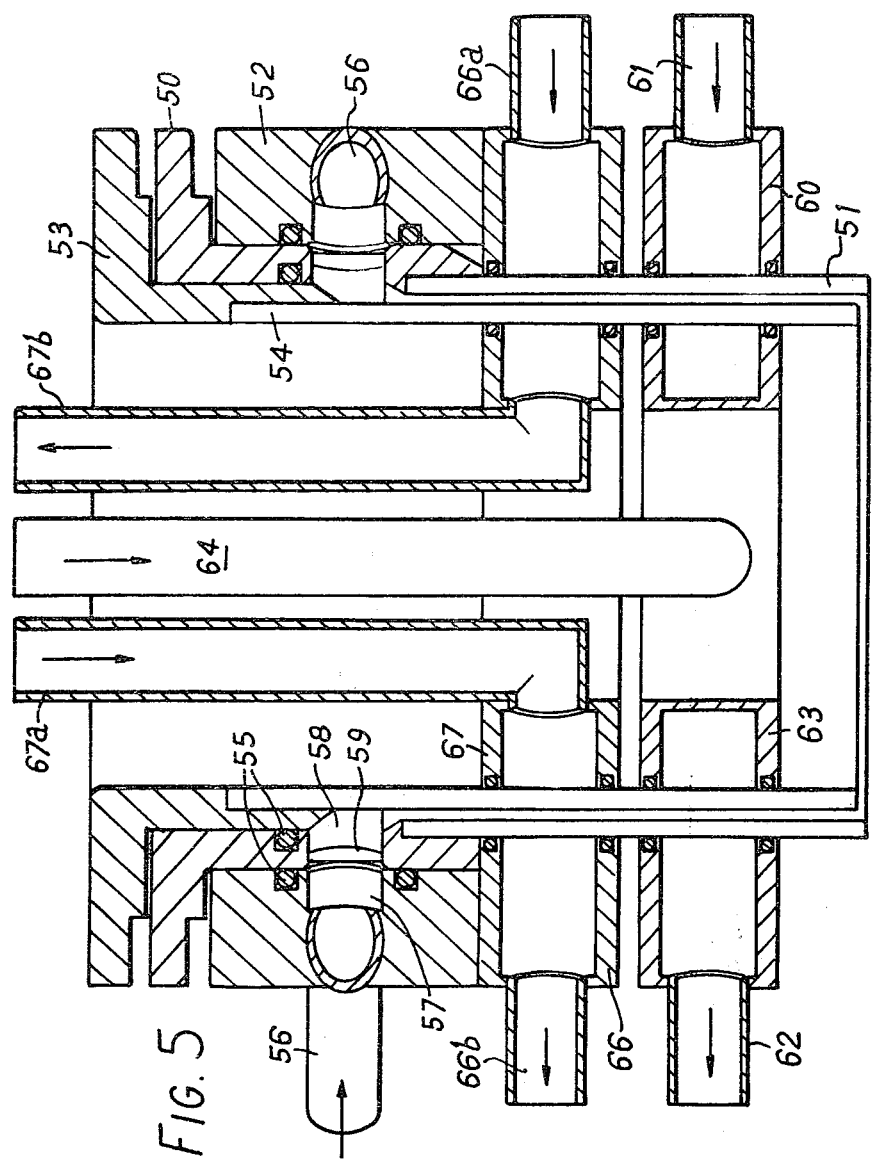
FIG. 5 shows an embodiment adapted for the production of large diameter tubing, suitable for the manufacture of elastic bands or rubber thread.

A further form of the apparatus, adapted for the production of large diameter tubing, is shown in FIG. 5. In this form of the apparatus, the plug 50 carrying the larger diameter glass tube 51 is mounted in the upper end of the bore in the head block 52 and the plug 53 carrying the smaller diameter tube 54 is mounted within plug 50, the plugs being sealed by O-rings 55. Latex enters the head block through two diametrically opposed inlet tubes 56 each set at an angle of 45° to the radial dimension of the common axis of tubes 51, 54. An annular recess 57 is machined in the block, and is aligned with an annular recess 58 machined inside the plug 50 holding the outer glass tube 51. The latex compound passes from recess 57 into recess 58 through a series of holes 59 drilled radially in the outer wall of recess 58 in plug 50, and then flows down the annular passage between tubes 51, 54. The dual inlet tubes 56 serve to ensure the smooth filling of recesses 57 and 58.

In the production of large diameter tubing it is necessary to heat the extruding compound from both sides, as shown in FIG. 5, to cause gelation. Hot water is circulated through the outer hot water jacket 60 entering at 61 and leaving at 62, and through the inner jacket 63 which it enters through a tube 64 and leaves through a similar diametrically opposite tube. Cold water jackets 66, 67 for preventing premature gelation are provided, the outer jacket 66 having an inlet 66a and an outlet 66b and the inner jacket 67 having an inlet 67a and an outlet 67b.

Figure 6:
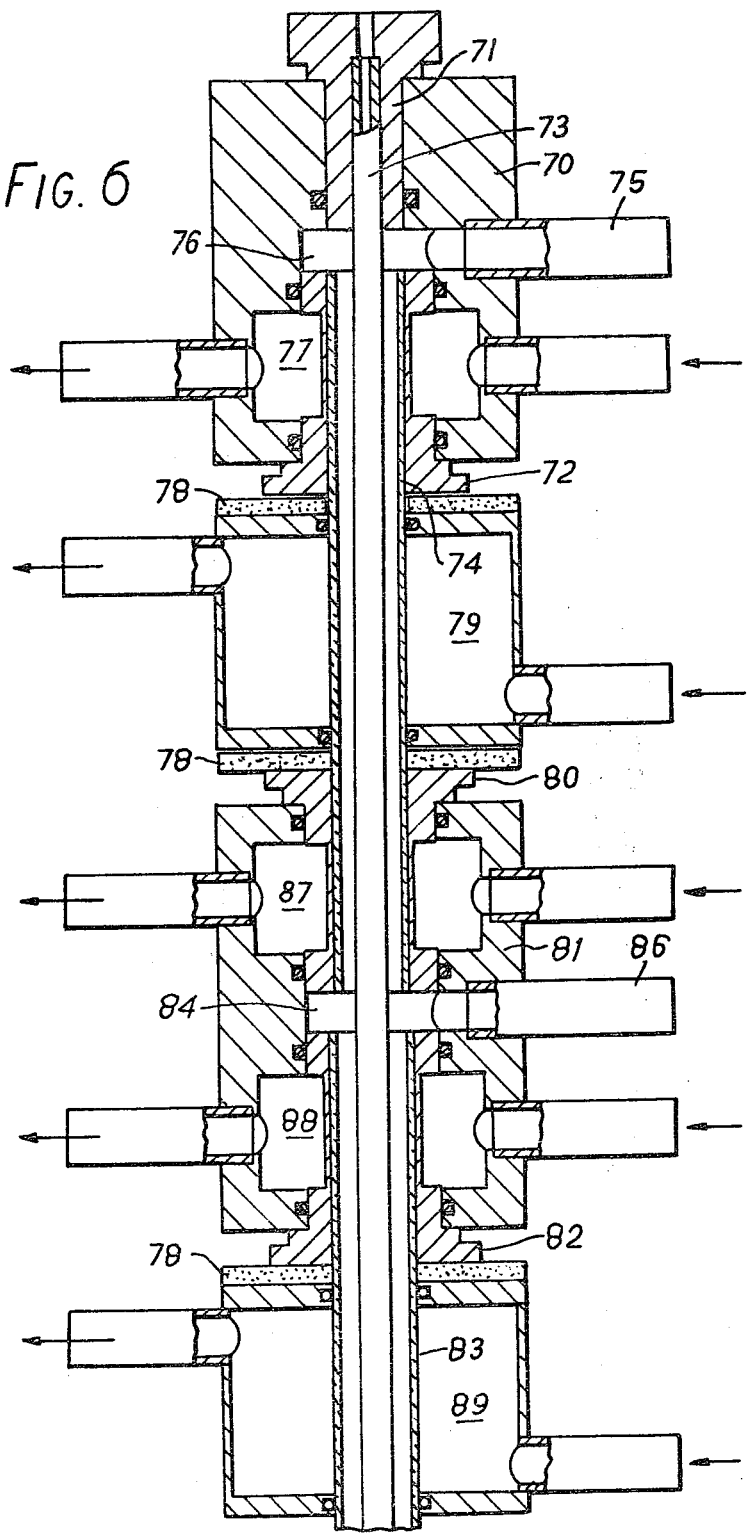
FIG. 6 shows an embodiment adapted to produce tubing having its walls in layers of differing polymer compositions.

The form of the apparatus shown in FIG. 6 is designed to enable tubing to be made which is double-walled, the outer wall being formed on the inner wall, so that for example tubing can be made which has an inner wall of one polymer and an outer wall of another, different polymer. The apparatus comprises an upper head block 70 in which are removably secured upper and lower annular plugs 71, 72 carrying smaller and larger diameter tubes 73, 74 respectively. The head block provides an inlet passage 75 leading to an inlet chamber 76 at the upper end of the plug 72 and tube 74. The head block 70 also provides a cold water jacket 77 about plug 72. Below the block 70 and insulated therefrom by a heat insulating washer 78 is a hot water jacket 79 for producing gelation of the latex extruded between tubes 73 and 74. The lower end of the outer tube 74 is bonded into the upper plug 80 of a second extruder which comprises a head block 81 carrying a lower plug 82 in addition to plug 80. Plug 82 carries a tube 83 the internal diameter of which is greater than the internal diameter of tube 74 and hence of the tubing extruded between tubes 73 and 74. Between plugs 80 and 82 block 81 provides an inlet chamber 84 fed with latex through a passage 86. The inner tube 73 extends uninterruptedly through tubes 74 and 83. Thus latex in the chamber 84 fills the space between the inner surface of tube 83 and the external surface of the tubing extruded between tubes 73 and 74 and forms an outer layer or wall on the tubing. Block 81 incorporates cold water jackets 87, 88 about the plugs 80 and 82 to prevent premature gelation of the latex forming the outer layer or wall. A hot water jacket 89 for gelling the outer layer is disposed about tube 83 as shown. Further heat insulating washers 78 are disposed between hot water jacket 79 and plug 80 and between hot water jacket 89 and plug 82.

A simple clamping device (not shown) may be used to prevent accidental separation of one or more of the four sections due to the dead weight of liquid being carried within the apparatus whilst in use overcoming the frictional retaining force provided by the sealing O-rings within each section.

It is found that the two layers or walls are fully bonded together, and it will be understood that additional layers or walls can be provided in a similar manner, each being deposited on the preceding layer or wall.

We claim:

1. A latex extruding apparatus comprising:

a head block having a central bore therethrough;

two vertically-disposed annular plugs sealingly engaged in said bore through said head block, said annular plugs having coaxially aligned bores therethrough;

two vertically disposed precision tubes, each tube secured at one end respectively in one of said annular plugs, and one of said tubes being arranged coaxially within the other so as to form a vertical annular passage therebetween;

said head block having a chamber formed therein, said chamber being opened to the upper end of said annular passage;

said head block further having an inlet passage therein into said chamber;

container means connected to said inlet passage for supplying latex to said inlet passage and said chamber by gravity; and means for venting the interior of the inner of said two coaxially aligned precision tubes with the atmosphere.

2. An apparatus as claimed in claim 1, wherein one of said annular plugs is mounted within the other plug.

3. An apparatus as claimed in claim 1, wherein said inlet passage extends in a direction inclined to the radial direction with respect to the common axis of said tubes so that a unidirectional circumferential motion of latex is produced through said chamber.

4. An apparatus as claimed in claim 1, further comprising:

at least one additional gravity container means for supplying latex connected to said inlet passage; and valve means between said plurality of container means and said inlet passage for selectively placing any one of said plurality of container means in communication with said inlet passage.

5. An apparatus as claimed in claim 4, wherein said valve means is operable to terminate the flow of latex in said inlet passage.

6. An apparatus as claimed in claim 4, wherein said inlet passage has apertures therein through which the contents of said respective gravity container means can be fed into said inlet passage; and further comprising stirring means in said inlet passage wherein said apertures open into said inlet passage for stirring said latex as it passes through said inlet passage.

7. An apparatus as claimed in claim 1, further comprising:

hot water jacket means around the outer tube of said vertical precision tubes for gelling latex passing between said tubes; and cold water jackets means around the outer tube of said vertical precision tubes at a location axially between said chamber and said hot water jacket means.

8. An apparatus as claimed in claim 7, further comprising:

a second head block;

a third vertical precision tube having a larger internal diameter than the outer tube of said coaxially aligned tubes;

said second head block carrying the end of said outer tube remote from that carried by said first head block and one end of said third tube;

said third tube being coaxially aligned with and having one end thereof axially spaced from the adjacent end of said outer tube;

said second head block providing a second chamber between the adjoining ends of said outer tubes and said third tube;

said second head block having an inlet passage therethrough for latex opening into said second chamber; and the inner of said two tubes carried by said first head block extending coaxially through said third tube.

9. An apparatus as claimed in claim 8, further comprising hot water and cold water jacket means surrounding said third tube, said cold water jacket means being disposed axially between said hot water jacket means and said second chamber in said second head block.

* * * * *